(12) United States Patent
Ishizaki et al.

(10) Patent No.: US 12,292,124 B2
(45) Date of Patent: May 6, 2025

(54) CHECK VALVE

(71) Applicant: ISHIZAKI CO., LTD., Tokyo (JP)

(72) Inventors: Nobuyuki Ishizaki, Tokyo (JP);
Takeshi Ouchi, Tokyo (JP); Eiji Hara, Tokyo (JP)

(73) Assignee: ISHIZAKI CO., LTD., Tokyo (JP)

( * ) Notice: Subject to any disclaimer, the term of this patent is extended or adjusted under 35 U.S.C. 154(b) by 0 days.

(21) Appl. No.: 18/278,668

(22) PCT Filed: Mar. 9, 2022

(86) PCT No.: PCT/JP2022/010289
§ 371 (c)(1),
(2) Date: Aug. 24, 2023

(87) PCT Pub. No.: WO2022/191239
PCT Pub. Date: Sep. 15, 2022

(65) Prior Publication Data
US 2024/0133474 A1 Apr. 25, 2024
US 2024/0229949 A9 Jul. 11, 2024

(30) Foreign Application Priority Data

Mar. 11, 2021 (JP) ................................. 2021-039670
Mar. 8, 2022 (JP) ................................. 2022-035357

(51) Int. Cl.
*F16K 15/06* (2006.01)
*F16K 27/02* (2006.01)

(52) U.S. Cl.
CPC ........ *F16K 15/063* (2013.01); *F16K 27/0209* (2013.01)

(58) Field of Classification Search
CPC ... F16K 15/067; F16K 15/063; F16K 27/0209
See application file for complete search history.

(56) References Cited

U.S. PATENT DOCUMENTS 2,026,110 A    12/1935  Wheaton
2,271,497 A *  1/1942   Newell ................. F16K 15/067
                                                   137/493
(Continued)

FOREIGN PATENT DOCUMENTS

JP    2007-24241 A    2/2007
JP    2012-159122 A   8/2012
(Continued)

OTHER PUBLICATIONS

International Search Report dated Apr. 12, 2022, issued in counterpart International Application No. PCT/JP2022/010289, w/English translation (5 pages).
(Continued)

*Primary Examiner* — Atif H Chaudry
(74) *Attorney, Agent, or Firm* — WHDA, LLP

(57) ABSTRACT

The check valve includes: an inlet pipe body part (23) which includes an inflow port (23*b*); an outlet pipe body part (25) which includes an outflow port (25*b*); a mobile body (a reciprocative body (2)). Insides of the inlet pipe body part, the outlet pipe body part, and the valve body (12) are communicated to form a curved flow path from the inflow port toward the outflow port. The reciprocative body includes a valve element (6). The seat (23*c*) is arranged so as to be capable of supporting the valve element and the inflow port and the seat are arranged parallel to each other. An inner wall surface (23*y*) on an outside-corner side of the flow path in the inlet pipe body part is formed so as to curve toward a side of the outlet pipe body part as a position gets closer from the inflow port to the seat.

7 Claims, 10 Drawing Sheets

(56) References Cited

U.S. PATENT DOCUMENTS

| | | | |
|---|---|---|---|
| 2,516,247 | A | 7/1950 | Nuenemann |
| 3,542,332 | A | 11/1970 | Chevalier et al. |
| 9,816,622 | B2 | 11/2017 | Chiba |
| 2007/0017577 | A1 | 1/2007 | Kouzu et al. |
| 2012/0193564 | A1 | 8/2012 | Takeuchi et al. |
| 2015/0122353 | A1 | 5/2015 | Chiba |
| 2019/0153927 | A1 | 5/2019 | Inoue et al. |
| 2022/0228670 | A1 | 7/2022 | Lee |

FOREIGN PATENT DOCUMENTS

| | | | |
|---|---|---|---|
| JP | 2015-94275 | A | 5/2015 |
| JP | 2017-219112 | A | 12/2017 |
| KR | 101216035 | B1 | 12/2012 |
| WO | 2013/180108 | A1 | 12/2013 |
| WO | 2020262936 | A1 | 12/2020 |

OTHER PUBLICATIONS

Extended Supplementary European Search Report dated Aug. 13, 2024, issued in counterpart Application No. 22767193.0. (8 pages).

\* cited by examiner

CHECK VALVE

TECHNICAL FIELD

The present invention relates to a check valve.

BACKGROUND ART

Check valves that allow a fluid in a pipe to pass in one direction are known. There are check valves of various types that are classified according to operating modes of a valve element.

Among such check valves, a lift check valve is structured such that a valve element linearly reciprocates in a direction which the valve element approaches or moves away from a seat and is capable of a quick closing operation. In particular, a Smolensky-type lift check valve is equipped with a spring that enables occurrences of water hammer to be suitably suppressed.

Patent Document 1 describes a lift check valve which includes a seat and a valve element that linearly reciprocatively swings in a direction which the valve element approaches or moves away from the seat, wherein an inflow direction of a fluid that flows to a side of the seat and an outflow direction in which the fluid passes through the valve element and flows out intersect with each other.

CITATION LIST

Patent Documents

Patent Document 1: International Publication No. WO 2013/180108

SUMMARY OF THE INVENTION

Problem to be Solved by the Invention

However, the check valve described in Patent Document 1 has room for improvement in terms of reducing pressure loss.

The present invention has been made in consideration of the problem described above and an object thereof is to provide a check valve capable of reducing pressure loss.

Means for Solving the Problem

A check valve according to the present invention is an angle-type check valve in which an inflow direction and an outflow direction intersect with each other, the check valve including: an inlet pipe body part which includes an inflow port; an outlet pipe body part which includes an outflow port; a mobile body which is movable to a position where a flow of a fluid is stopped and a position where a flow of the fluid is allowed; and a valve body which houses the mobile body, wherein insides of the inlet pipe body part, the outlet pipe body part, and the valve body are communicated to form a curved flow path from the inflow port toward the outflow port, the mobile body includes a valve element, the inlet pipe body part or the valve body is provided with a seat, the seat is arranged so as to be capable of supporting the valve element, the inflow port and the seat are arranged parallel to each other, and an inner wall surface on an outside-corner side of the flow path in the inlet pipe body part is formed so as to curve toward a side of the outlet pipe body part as a position gets closer from the inflow port to the seat.

Effect of the Invention

According to the present invention, a fluid is enabled to flow smoothly from an inlet pipe body part to an outlet pipe body part and pressure loss can be reduced.

DESCRIPTION OF EMBODIMENTS

Hereinafter, embodiments of the present invention will be described with reference to the drawings.

It should be noted that the embodiments described below merely represent examples for facilitating understanding of the present invention and are not intended to limit the present invention. In other words, shapes, dimensions, arrangements, and the like of members described below may be modified or improved without departing from the spirit and scope of the present invention and the present invention is intended to cover all equivalents thereof.

Furthermore, in all of the drawings, similar constituent elements will be denoted by similar reference signs and redundant descriptions will not be repeated. While descriptions may be given in the present specification by defining up-down directions, the up-down directions are merely set for the sake of convenience for explaining correspondence relationships among the constituent elements and are not intended to limit directions during production or during use of products according to the present invention.

First Embodiment

Figure 1:
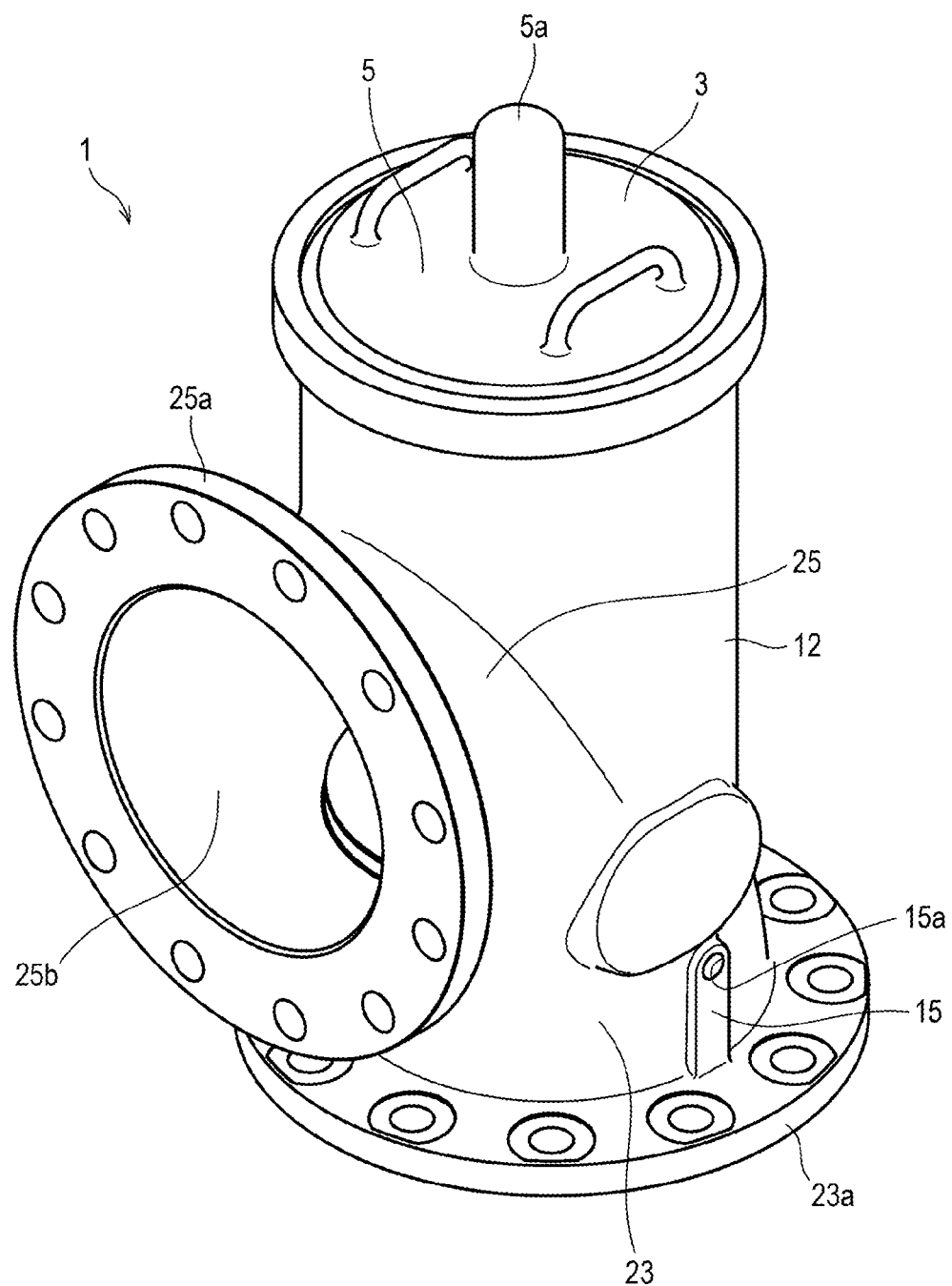
FIG. 1 is a perspective view showing an outer appearance of a check valve according to a first embodiment of the present invention.

<Outline of Check Valve>
First, an outline of a check valve 1 according to a first embodiment will be described mainly with reference to FIGS. 1 to 3. FIG. 1 is a perspective view showing an outer appearance of the check valve 1 according to the first embodiment of the present invention, FIG. 2 is a longitudinal sectional view of the check valve 1 in a closed state, and FIG. 3 is a longitudinal sectional view of the check valve 1 in an open state.

A cross section including an axial center of a valve stem 7 and center lines of an inlet pipe body part 23 and an outlet pipe body part 25 will be referred to as a longitudinal cross section.

As shown in FIG. 1, the check valve 1 according to the present embodiment is an angle-type check valve in which an inflow direction and an outflow direction intersect with each other.

Figure 2:
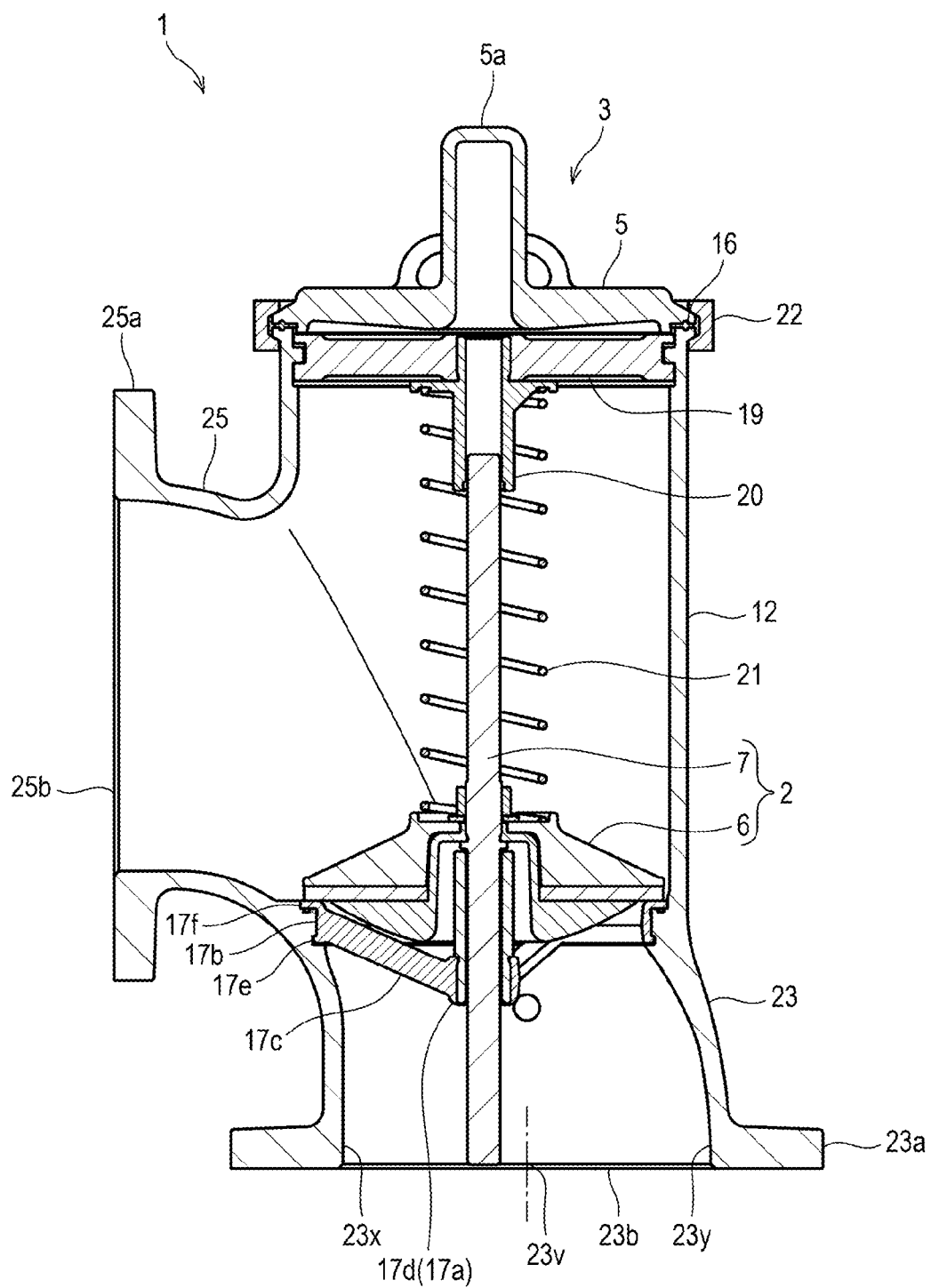
FIG. 2 is a longitudinal sectional view of the check valve in a closed state.
Figure 3:
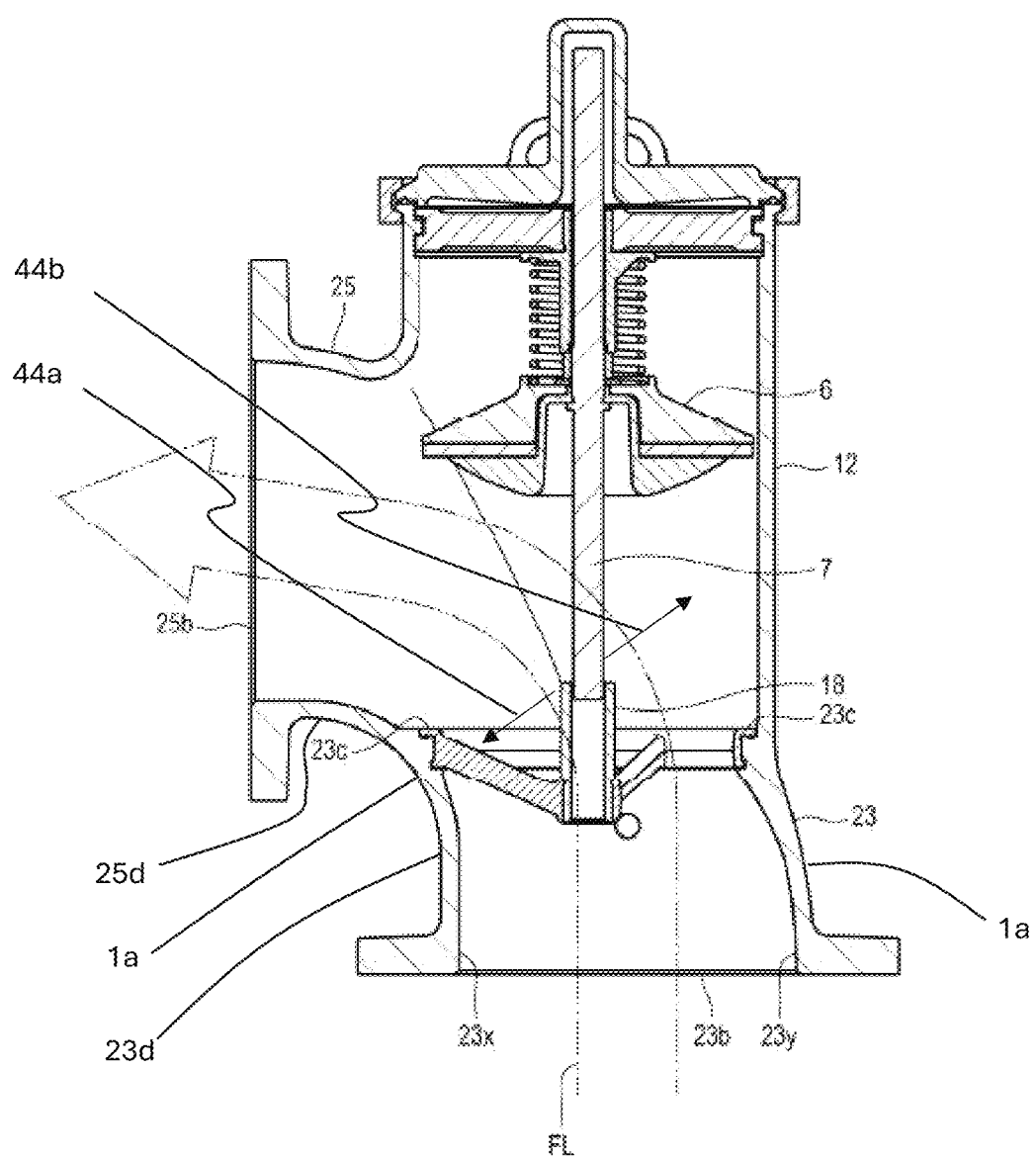
FIG. 3 is a longitudinal sectional view of the check valve in an open state.

As shown in FIG. 2, the check valve 1 includes: the inlet pipe body part 23 which includes an inflow port 23b; the outlet pipe body part 25 which includes an outflow port 25b; a mobile body (a reciprocative body 2) which is movable (reciprocable) to a position where a flow of a fluid is stopped and a position where a flow of the fluid is allowed; and a valve body 12 which houses the reciprocative body 2.

As shown in FIG. 3, insides of the inlet pipe body part 23, the outlet pipe body part 25, and the valve body 12 are communicated to form a curved flow path FL from the inflow port 23b toward the outflow port 25b. The reciprocative body 2 includes a valve element 6.

The inlet pipe body part 23 is provided with a seat 23c. Alternatively, the seat 23c may be provided in the valve body 12. The seat 23c is arranged so as to be capable of supporting the valve element 6, and the inflow port 23b and the seat 23c are arranged parallel to each other.

An inner wall surface 23y on an outside-corner side of the flow path FL in the inlet pipe body part 23 is formed so as to curve toward a side of the outlet pipe body part 25 as a position gets closer from the inflow port 23b to the seat 23c.

As shown in FIG. 3, the angle-type check valve 1 has an outside wall 1a thereof. The outside wall 1a forms the outer surface of the angle-type check valve 1. The outer surface is the surface that forms the external shape of the angle-type check valve 1. The outside wall 1a is the wall that composes the valve body 12, and is the case that composes the outside of the check valve 1. The inlet pipe body part 23 constitutes a first part 23d of the outside wall 1a. The outlet pipe body part 25 constitutes a second part 25d of the outside wall 1a. The curved flow path FL provides an inside-corner side 44a and an outside-corner side 44b.

More specifically, the check valve 1 as an angle valve according to the present embodiment is configured to have a reciprocation region of the reciprocative body 2 on an extension of the inflow direction of the fluid and to cause the fluid to flow out in a direction intersecting the inflow direction across the reciprocation region of the reciprocative body 2.

In addition, the check valve 1 according to the present embodiment is a lift check valve in which the reciprocative body 2 is linearly reciprocable in a direction which the reciprocative body 2 approaches or moves away from the seat 23c. The check valve 1 according to the present embodiment is to be used as a grounded foot valve and, by using the check valve 1 on a primary side of a lifting pump (not illustrated), the check valve 1 can favorably prevent water from going down in a lifting pipe due to high reliability of water stopping.

However, the present invention is not limited to such a configuration and may be configured as a swing check valve, a wafer-type check valve, and the like. In addition, while a fluid for which a back flow is regulated by the check valve 1 is a liquid such as water, the present invention is not limited to such a configuration. The fluid which passes through the check valve 1 may be a gas such as air.

While the inlet pipe body part 23, the outlet pipe body part 25, and the valve body 12 are formed by integral molding in the present embodiment, the present invention is not limited to such a configuration and may be configured by bonding separate elements by welding or the like.

In addition, "toward a side of the outlet pipe body part 25" is synonymous with "to approach the outlet pipe body part 25".

According to the configuration described above, due to the inner wall surface 23y on an outside-corner side of the flow path FL in the inlet pipe body part 23 being formed so as to curve toward the side of the outlet pipe body part 25 as a position gets closer to the seat 23c, a fluid can be caused to flow smoothly from the inlet pipe body part 23 to the outlet pipe body part 25 and pressure loss can be reduced.

Since movement of the valve element 6 may be inhibited by pressure due to residual air in a boss 5a of a cap 3 to be described later, the valve element 6 need not necessarily be configured to become fully open insofar as a desired flowage area can be secured. While a fully open state of the valve element 6 is shown in FIG. 3, an opening degree of the valve element 6 is to vary in accordance with a flow rate depending on a mass of the reciprocative body 2 and a restoring force of a spring body 21.

<<Configuration of Each Part>>

Next, a configuration of each part constituting the check valve 1 according to the present embodiment will be described.

The check valve 1 mainly includes the reciprocative body 2, the inlet pipe body part 23, the valve body 12 which houses the reciprocative body 2, a cap (the cap 3) to be attached to the valve body 12, a biasing member (the spring body 21) which biases the valve element 6 to a primary flow path side, and the outlet pipe body part 25 which is an outflow port of the fluid. In other words, the check valve 1 in the present specification refers to an entirety of a pipe joint which internally includes the valve element 6 and the like.

<Pipe Body Parts>

(Inlet Pipe Body Part)

As shown in FIG. 2, the inlet pipe body part 23 has the inflow port 23b of a fluid as described above and a flange part 23a at an edge on a side of an inflow end part.

An inner wall surface 23x on an inside-corner side of the flow path FL (refer to FIG. 3) in the inlet pipe body part 23 is arranged more inward in a radial direction than the valve element 6 as viewed from a side of the inflow port 23b. The inner wall surface 23y on an outside-corner side of the flow path FL in the inlet pipe body part 23 is arranged more outward in the radial direction than the valve element 6 as viewed from the side of the inflow port 23b.

According to the configuration described above, pressure loss can be reduced by guiding, from a side of the inlet pipe body part 23, a flow of a fluid from the inlet pipe body part 23 toward the outlet pipe body part 25 via the valve element 6.

As shown in FIG. 1, in the inlet pipe body part 23, a flat mount 15 for mounting a suction tube (not illustrated) connected to a suction pump (not illustrated) is formed so as to extend upward from a top surface of the flange part 23a while protruding more outward in the radial direction than its surroundings. A pressure reducing port 15a which penetrates to inside on a primary flow path side (an inflow port side) of the valve body 12 is formed in the mount 15.

By actuating the suction pump and sucking in a fluid from the suction tube toward the pressure reducing port 15a, a worker can set an upstream side of the valve element 6 to negative pressure and fill the upstream side of the valve element 6 with the fluid.

Adopting a configuration in which a pressure sensor is mounted to the pressure reducing port 15a also enables the worker to check a pressure state inside the inlet pipe body part 23 and check whether the inside of the inlet pipe body part 23 is filled with the fluid.
(Valve Body)

The valve body 12 is a region which houses the reciprocative body 2 so as to be reciprocable and the valve body 12 according to the present embodiment is integrally formed with the inlet pipe body part 23 and the outlet pipe body part 25 by a lost wax method.

As shown in FIG. 2, an annular groove for mounting an upper guide member 19 is formed on an inner wall of an upper end part of the valve body 12. In addition, the cap 3 to be described later is removably mounted to the valve body 12 on an extension of the inflow direction (upward direction).
(Outlet Pipe Body Part)

The outlet pipe body part 25 includes the outflow port 25$b$ of a fluid as described above and includes a flange part 25$a$ at an edge on a side of an outflow end part as shown in FIG. 1.

The check valve 1 is fixed to piping (not illustrated) using a fastener (not illustrated) such as a bolt or a nut at the flange part 23$a$ of the inlet pipe body part 23 and the flange part 25$a$ of the outlet pipe body part 25 described above.
<Reciprocative Body>

Figure 4:
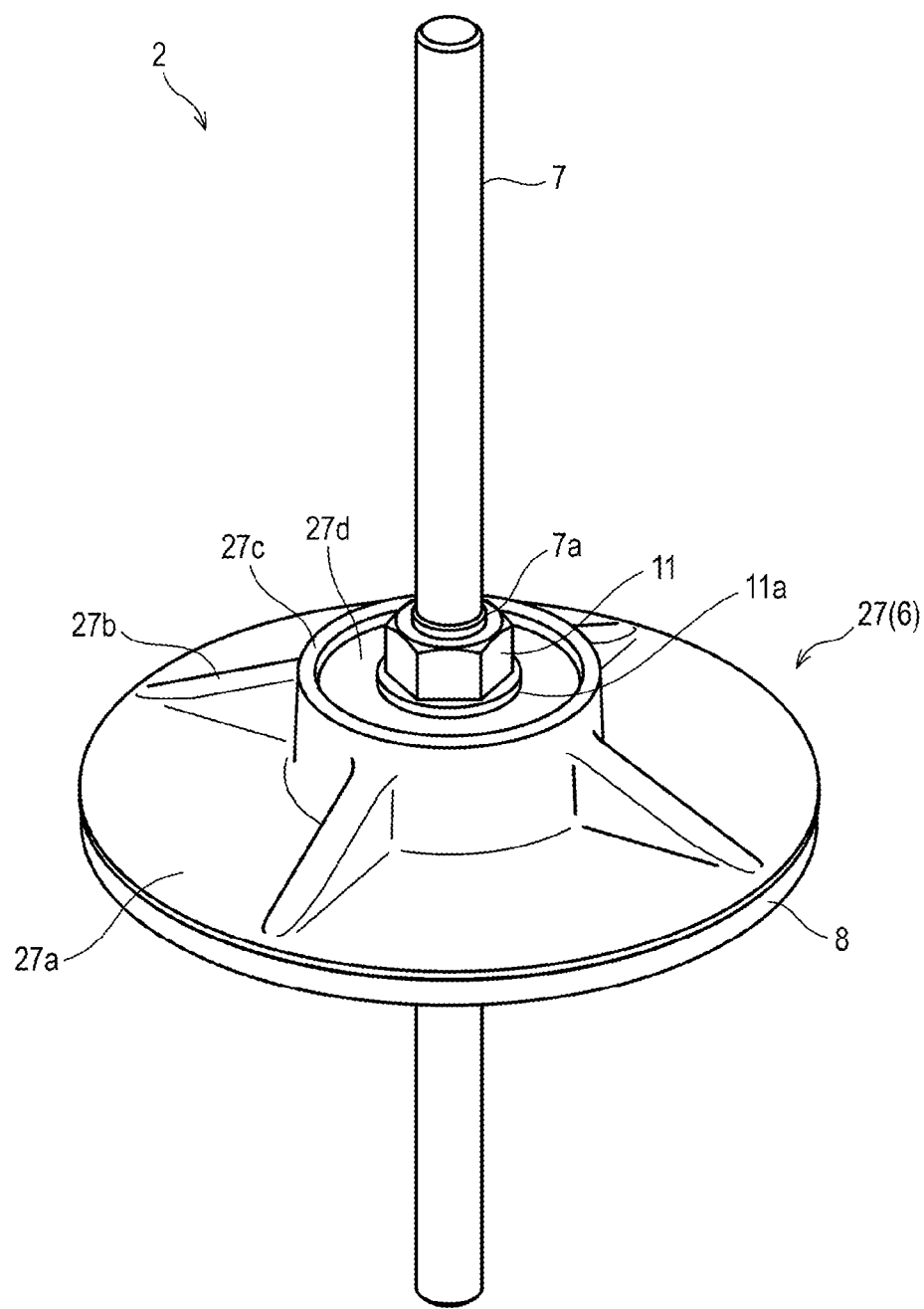
FIG. 4 is an upper perspective view showing a reciprocative body which constitutes the check valve.
Figure 5:
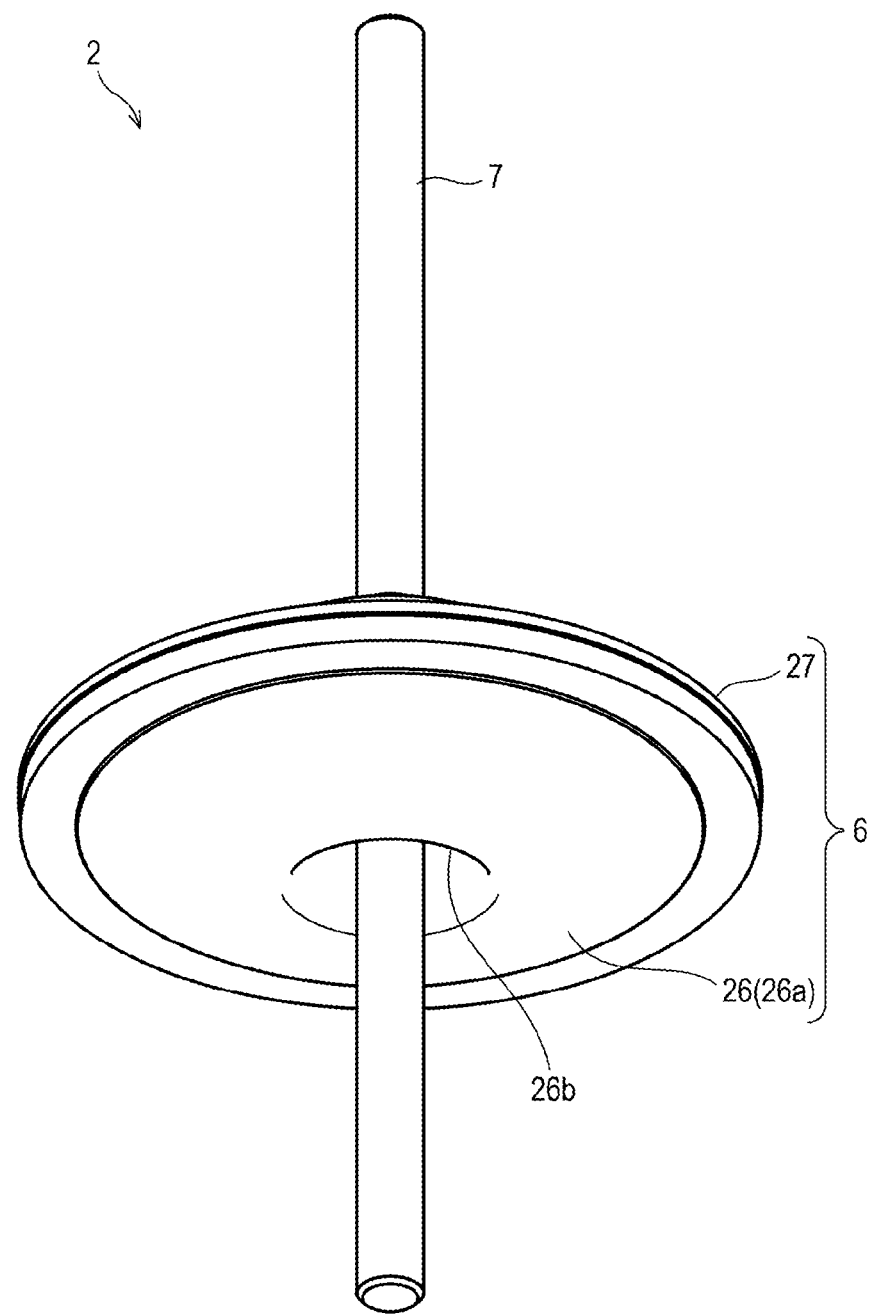
FIG. 5 is a lower perspective view showing the reciprocative body.
Figure 6:
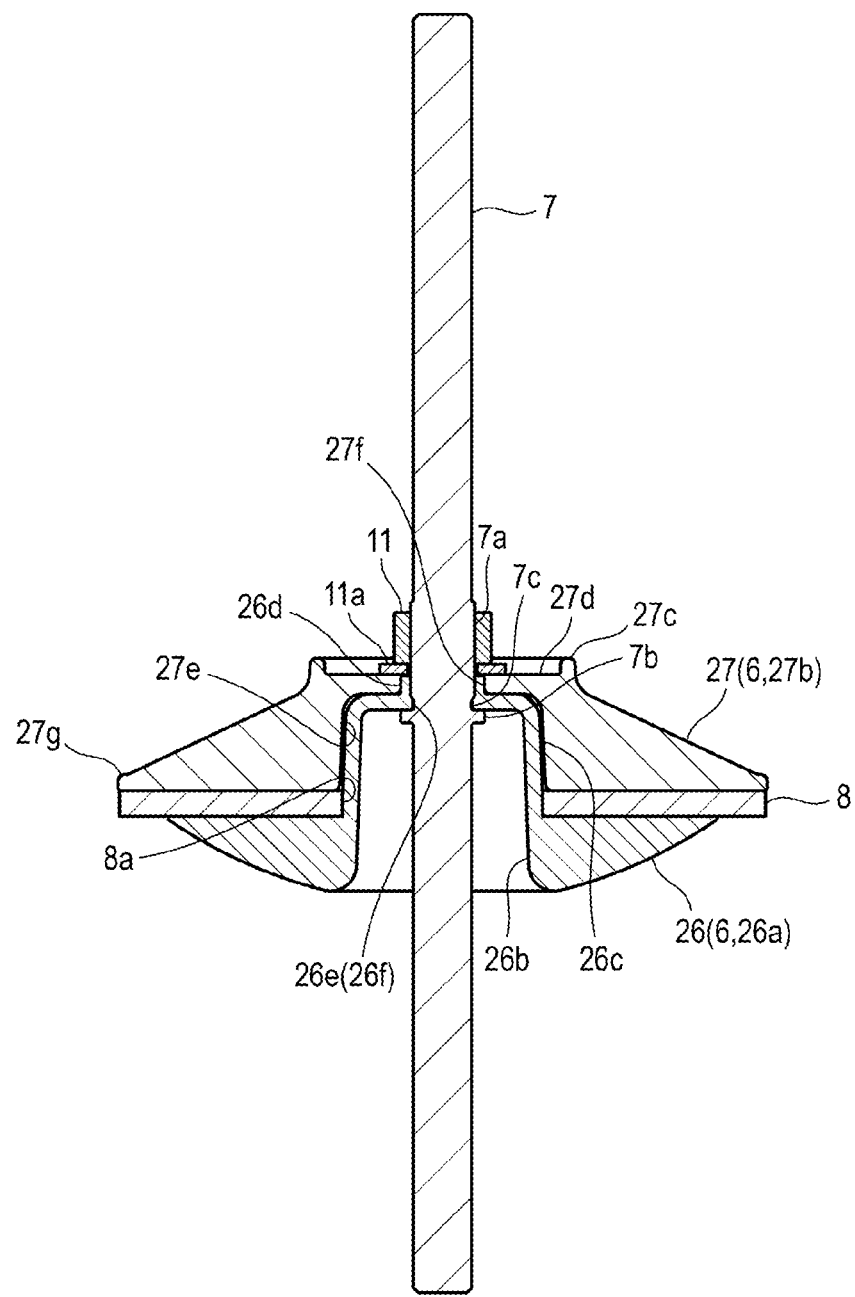
FIG. 6 is a longitudinal sectional view of the reciprocative body.

Next, the reciprocative body 2 will be described by mainly referring to FIGS. 4 to 6 in addition to FIGS. 2 and 3. FIG. 4 is an upper perspective view showing the reciprocative body 2 which constitutes the check valve 1, FIG. 5 is a lower perspective view showing the reciprocative body 2, and FIG. 6 is a longitudinal sectional view of the reciprocative body 2.

The reciprocative body 2 prevents back flow while adjusting an opening amount of the valve element 6 in accordance with a flow rate by causing the valve element 6 to approach the seat 23$c$ and move away from the seat 23$c$. The reciprocative body 2 is configured to be movable upward and downward in the valve body 12 and, as shown in FIG. 2, restricts a flow of a fluid when being positioned below and abutting against the seat 23$c$ (refer to FIG. 3). In addition, as shown in FIG. 3, the reciprocative body 2 allows the flow of the fluid and forms a flow path FL when being positioned above.
(Valve Stem)

The mobile body (reciprocative body 2) includes the valve element 6 capable of abutting against/separating from the seat 23$c$ and the valve stem 7 which is provided so as to guide the up-down motion of the reciprocative body 2 and which is mounted so as to penetrate a center part of the valve element 6.

The valve stem 7 is configured to come into slidable contact with a lower guide member 17, a guide adapter 18, the upper guide member 19, and a guide adapter 20 to be described later in order to prevent the reciprocative body 2 from wavering in a direction (radial direction) perpendicular to the axial direction of the valve stem 7 when the reciprocative body 2 reciprocates.

The valve stem 7 is formed in a rod shape and extends in a reciprocation direction and is guided by the lower guide member 17 (and the guide adapter 18) to be described later and the guide adapter 20 to be described later. The valve stem 7 is arranged shifted to the inside-corner side of the flow path FL than a center 23$v$ (refer to FIG. 2) of the inflow port 23$b$ as viewed from the side of the inflow port 23$b$.

In other words, the valve stem 7 is arranged in proximity to the inner wall surface 23$x$ on the inside-corner side than the inner wall surface 23$y$ on the outside-corner side of the flow path FL as viewed from the side of the inflow port 23$b$.

According to the configuration described above, due to the valve stem 7 being arranged shifted to the inside-corner side of the flow path FL than the center 23$v$ of the inflow port 23$b$, the seat 23$c$ provided in the inlet pipe body part 23 can be arranged at a high position.

In other words, a position of the valve element 6 fixed to the valve stem 7 is determined by a position of the valve stem 7 and a position of the seat 23$c$ which supports the valve element 6 is determined by a position of the valve element 6.

In addition, as described above, the inner wall surface 23$y$ on the outside-corner side of the flow path FL in the inlet pipe body part 23 is curved toward a side of the outlet pipe body part 25 as a position gets closer from the inflow port 23$b$ to the seat 23$c$. Therefore, the position of the seat 23$c$ and a position of the lower guide member 17 which is arranged below the seat 23$c$ are to be higher positions than in a case where the valve stem 7 is at the center 23$v$ of the inflow port 23$b$.

Therefore, the valve stem 7 which extends to a position that overlaps with the lower guide member 17 or to below the lower guide member 17 can be prevented from protruding from the inflow port 23$b$.

In addition, a stroke amount of the reciprocative body 2 can be reduced to advance a close timing of the valve element 6 from an open state to a closed state.

The valve stem 7 includes a screw part 7$a$ for tightening a nut 11 to be described later, a stopper 7$b$ which limits a downward movement of the valve element 6 to be described later, and an engaging depression 7$c$ which an engaging projection 26$e$ of a lower disk 26 to be described later engages with.

The engaging depression 7$c$ is positioned between the screw part 7$a$ and the stopper 7$b$ and formed with a smaller diameter than the screw part 7$a$ and the stopper 7$b$.

The spring body 21 mounted to a periphery of the valve stem 7 elastically biases a top surface (seat surface 27$d$) of the valve element 6 (upper disk 27) in both a closed state shown in FIG. 2 and an open state shown in FIG. 3.
(Valve Element)

The valve element 6 is a primary part of the check valve 1 and is provided in a lower end part of the valve stem 7 as shown in FIG. 6.

In the closed state shown in FIG. 2, the valve element 6 is biased by the spring body 21 and pushed against the seat 23$c$ (refer to FIG. 3).

In other words, the check valve 1 according to the present embodiment is a so-called Smolensky-type. Therefore, due to a biasing force produced by the spring body 21, the check valve 1 can quickly close the flow path by having the valve element 6 abut against the seat 23$c$ the moment a flow of the fluid reverses to a back flow which flows from the side of the outlet pipe body part 25 to the side of the inlet pipe body part 23. Accordingly, back flow can be prevented, an occurrence of water hammer can be suppressed, and reliability of a closed state (stop ability) can be enhanced.

However, the check valve 1 is not limited to a configuration in which the check valve 1 includes the spring body 21 and presses the valve element 6 against the seat 23$c$. For example, a configuration may be adopted in which the valve element 6 is pressed against the seat 23$c$ solely by a self-weight of the reciprocative body 2 or by the self-weight of the reciprocative body 2 and a load applied from a damper mechanism constituted of the valve stem 7 and the guide adapter 20 to be described later.

The valve element 6 includes the lower disk 26, the upper disk 27, and a disk-shaped packing 8 (refer to FIGS. 4 and 6) which is sandwiched between the lower disk 26 and the upper disk 27 and which adheres to the seat 23c (refer to FIG. 3) in a circular manner when the reciprocative body 2 shown in FIG. 2 is at a closed position.

The worker tightens the nut 11 to the screw part 7a in a state where the lower disk 26, the packing 8, and the upper disk 27 are arranged between the stopper 7b and the screw part 7a.

As a result, the lower disk 26, the packing 8, and the upper disk 27 are to be integrally sandwiched between a washer 11a provided between the nut 11 and the stopper 7b and the reciprocative body 2 is to be assembled together with the valve stem 7.

(Lower Disk)

At least a part (a bottom surface 26a) of a lower part of the valve element 6 (the lower disk 26) is formed in a partially spherical shape which protrudes toward the inflow port 23b.

A depression 26b which is depressed more upward than the bottom surface 26a is formed in a central portion of the lower part of the valve element 6 (the lower disk 26). The depression 26b forms a space between the valve stem 7 and the lower part of the valve element 6 (the lower disk 26) and is formed so as to be capable of housing at least a part of a guide member (the guide adapter 18).

More specifically, a protrusion 26c which protrudes upward so as to penetrate into a columnar depression 27e of the upper disk 27 to be described later is formed in the lower disk 26. An insertion hole 26f is formed in a center portion in the radial direction of the protrusion 26c, and the engaging projection 26e which engages with the engaging depression 7c of the valve stem 7 is formed on an inner wall surface of the insertion hole 26f.

In addition, a tubular support part 26d which extends upward is formed in an edge portion of the insertion hole 26f at a center of the protrusion 26c. The support part 26d is for increasing a contact area with the valve stem 7 to suitably support the valve stem 7.

The columnar depression 26b which is depressed more upward than the bottom surface 26a on the partial sphere is formed on an inner side of the protrusion 26c. Furthermore, the bottom surface 26a on an outer side in the radial direction of the depression 26b in the valve element 6 (the lower disk 26) is formed in a partially spherical shape.

The depression 26b enables the guide adapter 18 to be described later to be housed. As shown in FIG. 2, the depression 26b is formed with a larger diameter than the guide adapter 18 so that a bottom surface above the depression 26b is positioned above the guide adapter 18 in a closed state of the valve.

Due to the depression 26b being formed in this manner, interference (abutting) of the valve element 6 and the guide adapter 18 can be avoided and the lower guide member 17 to be described later including the seat 23c can be arranged at a high position.

As described above, since the side of the inflow port 23b is formed in a partially spherical shape, a decline in a speed of a fluid can be suppressed when the fluid passes the valve element 6. Therefore, the fluid can be caused to flow at a low head loss even in the lift check valve 1 in which an inflow direction to the seat 23c and a passing direction of the valve element 6 intersect with each other.

(Packing)

The packing 8 is a member which stops water by being pressed so as to be sandwiched between the valve element 6 and the seat 23c in the closed state of the check valve 1 and, as shown in FIG. 6, the packing 8 is arranged between the lower disk 26 and the upper disk 27.

The packing 8 is formed in an annular shape including a center hole 8a which penetrates the packing 8 in a thickness direction. The center hole 8a is formed larger than a diameter of an outer circumferential surface of the protrusion 26c formed in the lower disk 26 in a direction perpendicular to the axial center direction of the valve stem 7. In addition, the center hole 8a is formed in a same or equal (including approximately equal) size to a diameter of an inner circumferential surface of the depression 27e formed in the upper disk 27.

The packing 8 is arranged in a periphery of a lower end part of the protrusion 26c by being inserted, through the protrusion 26c of the lower disk 26, into the center hole 8a to a position abutting against a top surface in the lower disk 26 which is more outward in the radial direction than the protrusion 26c.

In particular, since the packing 8 according to the present embodiment is made of rubber, the packing 8 can stop water in a favorable manner due to high deformability which enables the packing 8 to adhere closely to the seat 23c.

A center portion in the radial direction of the packing 8 is positioned behind the lower disk 26 in an upward view when the reciprocation direction of the reciprocative body 2 is considered an up-down direction. On the other hand, an entirety of the packing 8 is positioned behind the upper disk 27 in a downward view.

The packing 8, and the lower disk 26 and the upper disk 27, may be additionally glued (or bonded) by an adhesive body such as an adhesive or a double-sided adhesive tape.

(Upper Disk)

As shown in FIG. 4, the upper disk 27 mainly includes a disk-shaped flat plate part 27a, a cylindrical part 27c formed so as to protrude upward from a center part of the flat plate part 27a, and a seat surface 27d which supports a lower end part of the spring body 21 and the washer 11a of the nut 11.

A through-hole 27f is formed at center of the seat surface 27d and configured so that the valve stem 7 can be inserted into the through-hole 27f. The depression 27e which houses the protrusion 26c of the lower disk 26 described above is formed on a lower surface side of the cylindrical part 27c. Four ribs 27b with a triangular shape in a side view are arranged at positions that deviate from each other by a central angle of 45 degrees in a plan view between the flat plate part 27a and the cylindrical part 27c. The ribs 27b are not formed so as to reach a peripheral edge 27g of the upper disk 27 and are connected to the flat plate part 27a.

The upper disk 27 uniformly supports the packing 8 in a planar direction with the packing 8 between the upper disk 27 and the lower disk 26 by having a top surface (the seat surface 27d) of the upper disk 27 being pushed via the washer 1a from the nut 11 tightened to the screw part 7a.

As described above, the lower disk 26 and the upper disk 27 are configured as an assembly of separate members. By configuring the lower disk 26 and the upper disk 27 as an assembly of separate members as described above, the packing 8 is more readily arranged between the lower disk 26 and the upper disk 27.

However, the lower disk 26 and the upper disk 27 are not limited to such a configuration and when the packing 8 can be mounted to the valve element 6 by deforming the packing 8 due to the packing 8 having flexibility, the lower disk 26 and the upper disk 27 need not necessarily be constituted of separate members.

<Guide Members>

Figure 7:
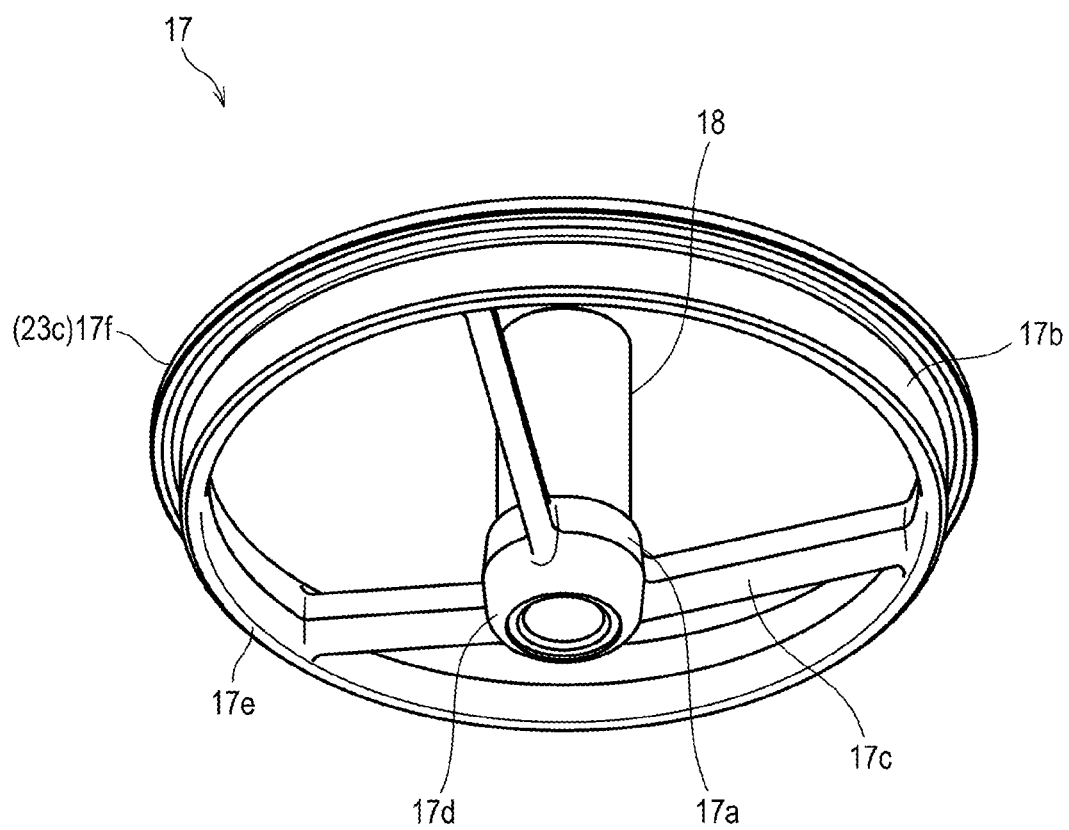
FIG. 7 is a lower perspective view showing a lower guide member and a guide adapter.
Figure 8:
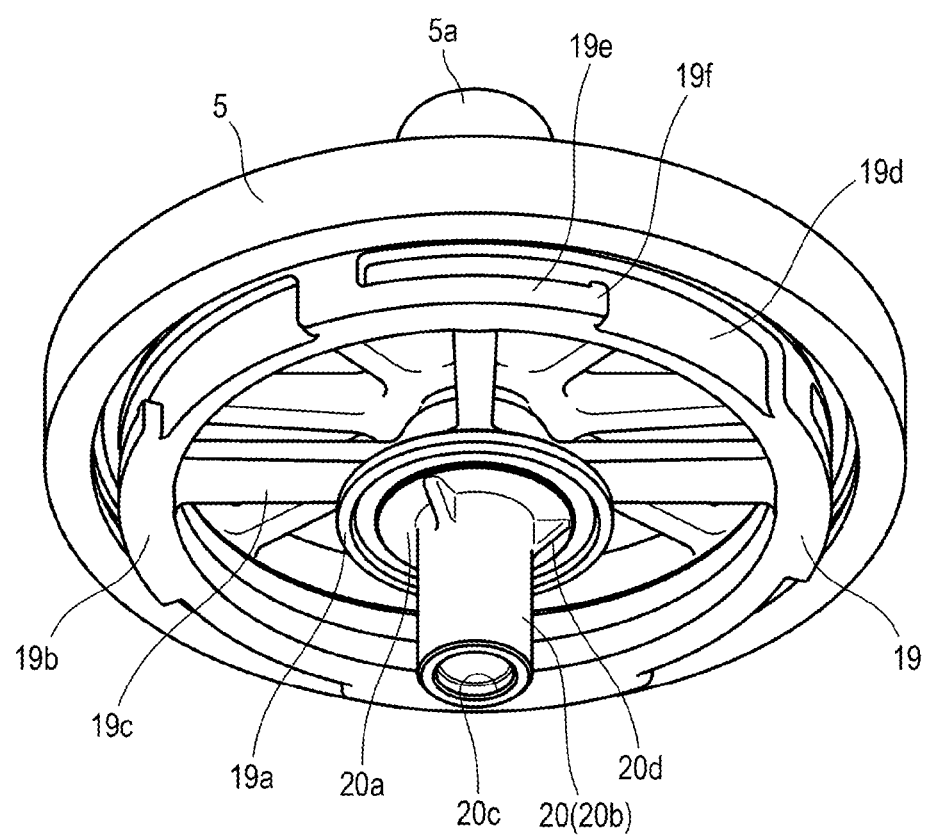
FIG. 8 is a lower perspective view showing a top plate part, an upper guide member, and a guide adapter.

Next, the guide members which guide reciprocation of the reciprocative body 2 will be described by mainly referring to FIGS. 7 and 8 in addition to FIGS. 2 and 3. FIG. 7 is a lower perspective view showing the lower guide member 17 and the guide adapter 18, and FIG. 8 is a lower perspective view showing a top plate part 5, the upper guide member 19, and the guide adapter 20.

(Lower Guide Member)

The inlet pipe body part 23 is provided with a guide member (the lower guide member 17) which guides (a lower part of) the valve stem 7. Note that the lower guide member 17 may be provided in the valve body 12 instead of the inlet pipe body part 23.

As shown in FIG. 7, the lower guide member 17 includes a central part 17a through which the valve stem 7 is passed, an outer part 17b which is more outward in the radial direction than the central part 17a and which includes the seat 23c, and a coupling part 17c which couples the central part 17a and the outer part 17b to each other. The coupling part 17c according to the present embodiment includes three rods which extend in a radial direction at 120-degree central angle intervals from the central part 17a and which are connected to the outer part 17b.

A lower end part 17d of the central part 17a is formed in a curved surface shape with a larger curvature than a region (bottom surface 26a) with a partially spherical shape of the valve element 6.

More specifically, the central part 17a has a function of guiding a movement of the reciprocative body 2 so that a lower end side of the reciprocative body 2 does not waver to a side of a radial direction of the valve stem 7 (a direction perpendicular to the axial center direction of the valve stem 7) when the reciprocative body 2 reciprocates. The central part 17a is formed in a thick ring shape which is larger in the up-down direction than the coupling part 17c and includes, in a central portion thereof, an insertion hole formed so as to penetrate the central part 17a in the up-down direction.

As described above, the lower end part 17d of the central part 17a is formed in a partially spherical shape. Therefore, a fluid that flows in from the inflow port 23b below collides with the lower end part 17d and spreads outward in the radial direction, flows toward the bottom surface 26a of the lower disk 26 formed more outward in the radial direction than the central part 17a, and pushes up the bottom surface 26a.

A lower end part of the guide adapter 18 is fitted to the central part 17a. The guide adapter 18 has a function of extending upward in a guide range of the central part 17a with respect to the valve stem 7 and is arranged so as to protrude above the central part 17a.

According to the configuration described above, due to the curvature of the lower end part 17d of the central part 17a being larger than a curvature of the valve element 6 that is pushed up by the fluid, pressure loss with respect to the fluid that flows in from the inflow port 23b can be reduced.

The outer part 17b is to be fixed to the inlet pipe body part 23 and is formed in a ring shape that is thick in a height direction and thin in a thickness direction.

A lower edge 17e of the outer part 17b is formed so as to extend more outward in the radial direction than an upper part thereof and fit into a groove formed on an inner wall surface of the inlet pipe body part 23. An upper edge 17f of the outer part 17b extends more outward in the radial direction than other regions (particularly, the lower edge 17e) and forms the seat 23c.

In other words, among a fluid that flows in from the inflow port 23b, the fluid abutting against the lower edge 17e of the central part 17a of the lower guide member 17 collides with the lower edge 17e and spreads, and collides with the bottom surface 26a of the valve element 6 and pushes up the valve element 6.

The central part 17a and the coupling part 17c in the guide member (the lower guide member 17) are formed so as to be more depressed in a direction (downward) of separation from the valve element 6 than the outer part 17b.

In other words, the coupling part 17c is extended upward while radially spreading from the central part 17a and connected to the outer part 17b. Therefore, the central part 17a and the coupling part 17c are formed so as to be depressed more downward than the outer part 17b.

According to such a configuration, even when the bottom surface 26a which constitutes a part of the valve element 6 that abuts against the seat 23c on the top surface of the outer part 17b bulges downward, (the bottom surface 26a of) the valve element 6 can be prevented from interfering with (abutting against) the central part 17a.

(Upper Guide Member)

The valve body 12 is provided with the upper guide member 19 which guides an upper part of the valve stem 7.

The upper guide member 19 includes a central part 19a, an outer part 19b which is more outward in the radial direction than the central part 19a, and a coupling part 19c which couples the central part 19a and the outer part 19b to each other. The coupling part 19c according to the present embodiment includes three rods which extend in a radial direction at 120-degree central angle intervals from the central part 19a and which are connected to the outer part 19b.

Housing grooves 19d which have an inverted L shape and which are uniformly depressed inward in the radial direction are arranged at 90-degree central angle intervals on a peripheral surface (an outer wall 19e) of the outer part 19b. The housing grooves 19d are a region for housing projecting strips formed on an inner wall in an upper part of the valve body 12 and are formed by a vertical groove which extends in the up-down direction and a lateral groove which extends toward a left wide in a side view from an upper part of the vertical groove. Lengths of the vertical groove and the lateral groove in a peripheral direction are equal (including approximately equal) to each other and a length of the vertical groove in the up-down direction is twice a length of the lateral groove in the up-down direction. Among the outer wall 19e, an engaging projection 19f which extends above other regions is formed in a portion opposing a portion where the vertical groove and the lateral groove intersect with each other.

The engaging projection 19f has a function of fixing the upper guide member 19 to the valve body 12 by engaging with a part of the projecting stripes formed on an inner wall in an upper part of the valve body 12.

An upper end part of the guide adapter 20 is fitted to the central part 17a of the upper guide member 19. The guide adapter 20 is erected downward (to the side of the inflow port 23b) from the upper guide member 19.

The guide adapter 20 guides a reciprocation of an upper end side of the valve stem 7 by having an inner wall surface of a through-hole 20c which penetrates a center of the guide adapter 20 come into slidable contact with the valve stem 7 so that the reciprocative body 2 becomes reciprocable without wavering in the radial direction.

The guide adapter 20 mainly includes a disk part 20a and a tubular part 20b which extends downward from a center of the disk part 20a. Four ribs 20d with a triangular shape in a side view are arranged at 45-degree center angle intervals in a bottom view between the disk part 20*a* and the tubular part 20*b*.

<Cap>

As shown in FIG. 2, the cap 3 is to be removably mounted to the valve body 12 to seal an upward side of the valve element 6. As shown in FIG. 2, the cap 3 is mainly constituted of a plate-shaped top plate part 5 and the boss 5*a* which protrudes upward from the top plate part 5.

The top plate part 5 includes a ferrule flange on an end edge and is stacked via a gasket 16 on a ferrule flange formed in an upper end part of the valve body 12, and is removably fastened by a ferrule 22.

The boss 5*a* internally includes a hollow space and is configured to be capable of housing the valve stem 7 having moved upward.

Second Embodiment

Next, a check valve 1X according to a second embodiment will be described with reference to FIG. 9 and FIG. 10.

Figure 9:
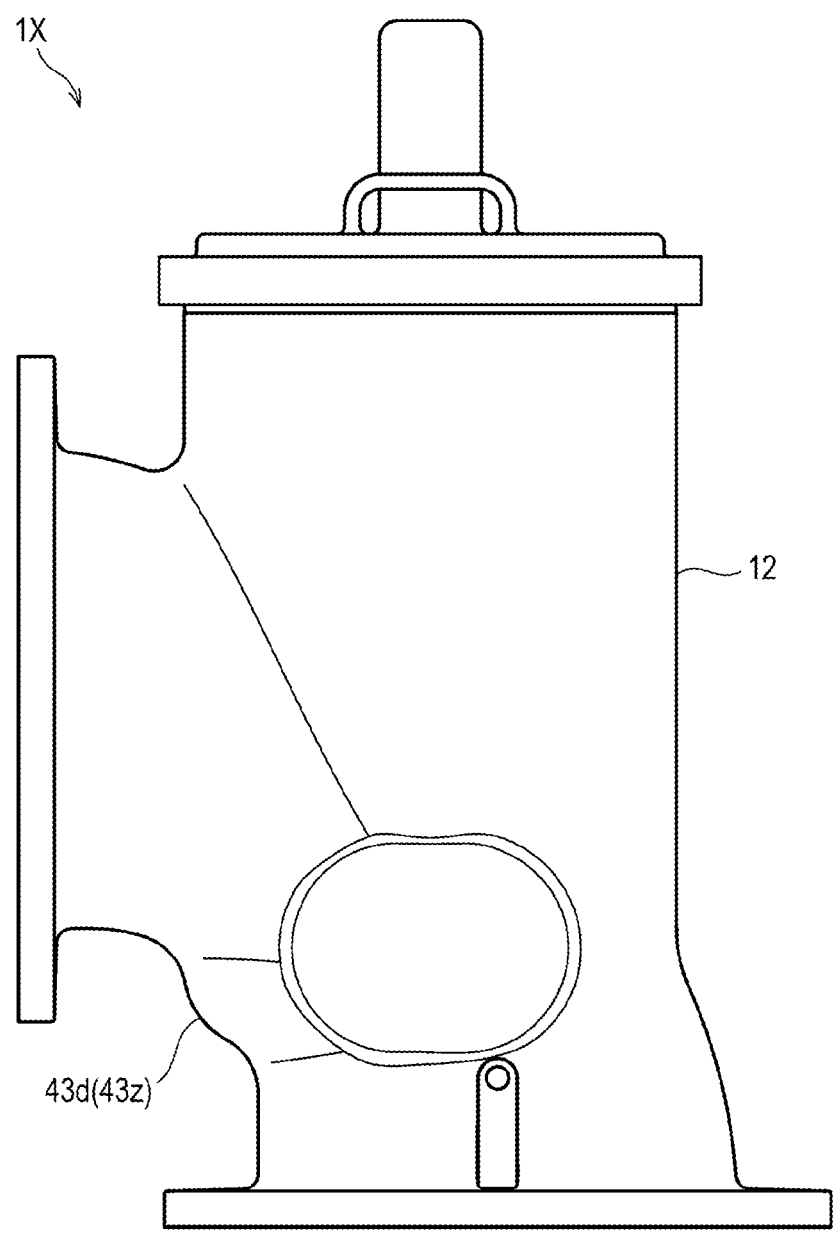
FIG. 9 is a front view showing an outer appearance of a check valve according to a second embodiment of the present invention.
Figure 10:
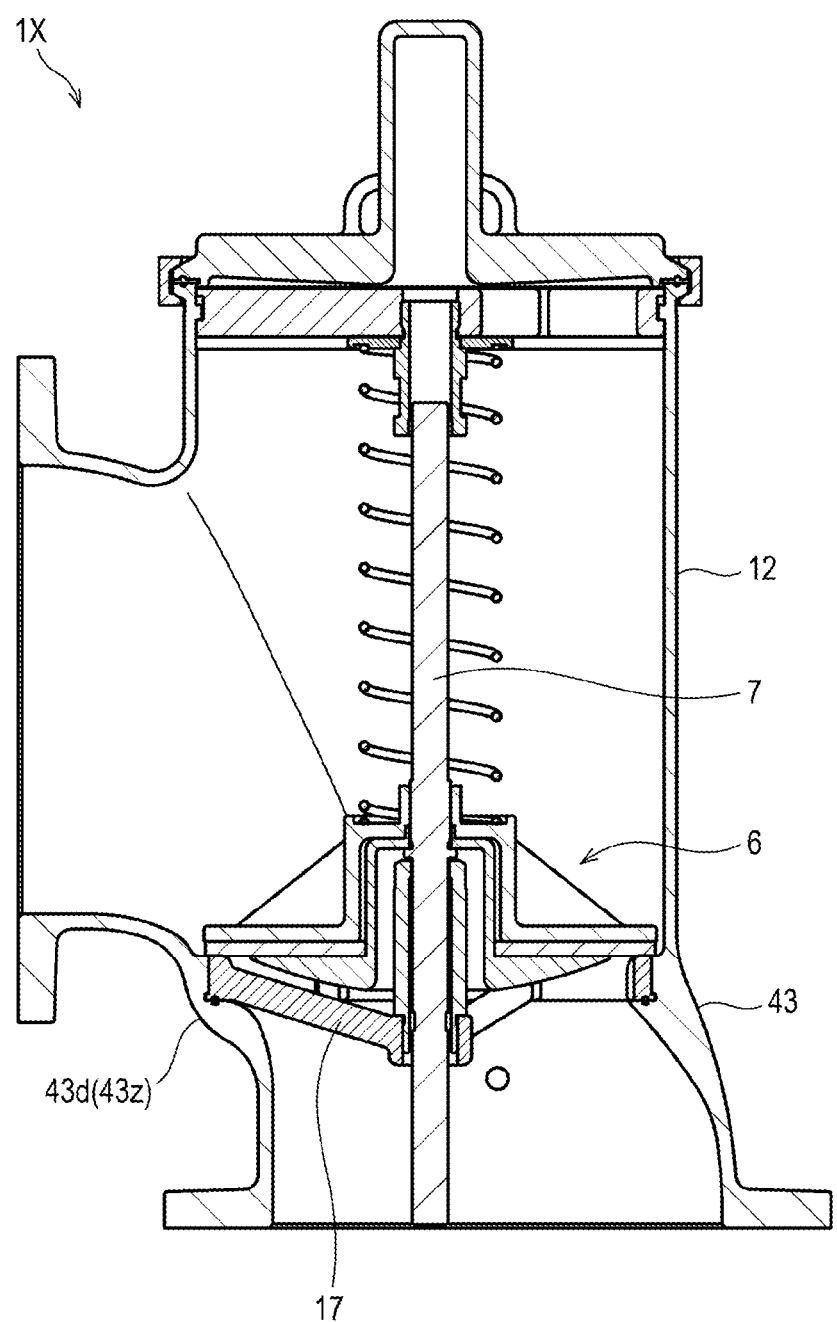
FIG. 10 is a longitudinal sectional view of the check valve according to the second embodiment.

FIG. 9 is a front view showing an outer appearance of the check valve 1X according to the second embodiment of the present invention, and FIG. 10 is a longitudinal sectional view of the check valve 1X.

An inlet pipe body part 43 is provided with a guide member (the lower guide member 17) which guides the valve stem 7. In a region that supports the lower guide member 17 in the inlet pipe body part 43, a protruding part 43*d* which protrudes from its surroundings is formed on an outer wall surface 43*z* on an inside-corner side of the flow path FL (refer to FIG. 3).

Specifically, the protruding part 43*d* is formed so as to only protrude on the inside-corner side of the flow path FL (refer to FIG. 3) on the outer wall surface 43*z* in the region that supports the lower guide member 17 in the inlet pipe body part 43. In addition, as shown in the longitudinal cross section in FIG. 10, the protruding part 43*d* is formed so as to protrude with respect to a virtual arc along the flow path FL on the inside-corner side of the outer wall surface 43*z* of the inlet pipe body part 43.

While the lower guide member 17 has been described as being provided in the inlet pipe body part 43, the lower guide member 17 is not limited to such a configuration and may be provided in the valve body 12.

According to the configuration described above, a thickness of the region that supports the guide member (the lower guide member 17) in the inlet pipe body part 43 or the valve body 12 can be prevented from becoming thin.

Therefore, by lowering a position in the up-down direction to be a start position of separation by the valve element 6 from the seat 23*c* which is the top surface of the lower guide member 17, the valve element 6 when supported by the seat 23*c* can be brought close to a position of a center of the flow path FL.

In addition, since a load of a fluid can act on the valve element 6 in an efficient manner, pressure loss when operating the valve element 6 can be reduced.

While respective embodiments have been described above with reference to the drawings, the embodiments are illustrative only and various configurations other than those described above can also be adopted.

Each of the various constituent elements of the check valves and the reciprocative member constituting the check valves according to the present invention need not be an individual entity. A plurality of constituent elements may be formed as a single member, a single constituent element may be formed by a plurality of members, a given constituent element may constitute a part of another constituent element, a part of a given constituent element and a part of another constituent element may overlap with each other, and the like.

The present embodiments cover the following technical ideas.

(1)

An angle-type check valve in which an inflow direction and an outflow direction intersect with each other, the check valve including:

an inlet pipe body part which includes an inflow port;

an outlet pipe body part which includes an outflow port;

a mobile body which is movable to a position where a flow of a fluid is stopped and a position where a flow of the fluid is allowed; and a valve body which houses the mobile body, wherein insides of the inlet pipe body part, the outlet pipe body part, and the valve body are communicated to form a curved flow path from the inflow port toward the outflow port, the mobile body includes a valve element, the inlet pipe body part or the valve body is provided with a seat, the seat is arranged so as to be capable of supporting the valve element, the inflow port and the seat are arranged parallel to each other, and an inner wall surface on an outside-corner side of the flow path in the inlet pipe body part is formed so as to curve toward a side of the outlet pipe body part as a position gets closer from the inflow port to the seat.

(2)

The check valve according to (1), wherein the mobile body further includes a valve stem, and the valve stem is arranged shifted to an inside-corner side of the flow path than a center of the inflow port as viewed from a side of the inflow port.

(3)

The check valve according to (1) or (2), wherein an inner wall surface on an inside-corner side of the flow path in the inlet pipe body part is arranged more inward in a radial direction than the valve element as viewed from a side of the inflow port, and the inner wall surface on the outside-corner side of the flow path in the inlet pipe body part is arranged more outward in the radial direction than the valve element as viewed from the side of the inflow port.

(4)

The check valve according to any one of (1) to (3), wherein the mobile body further includes a valve stem, at least a part of a lower part of the valve element is formed in a partially spherical shape which protrudes toward the inflow port, the inlet pipe body part or the valve body is provided with a guide member which guides the valve stem, the guide member includes a central part through which the valve stem is passed, an outer part which is more outward in the radial direction than the central part and which includes the seat, and a coupling part which couples the central part and the outer part to each other, and a lower end part of the central part is formed in a curved surface shape with a larger curvature than a region with a partially spherical shape of the valve element.

(5)

The check valve according to (4), wherein the central part and the coupling part in the guide member are formed more depressed in a direction of separation from the valve element than the outer part.

(6)

The check valve according to any one of (1) to (5), wherein
the mobile body further includes a valve stem,
the inlet pipe body part or the valve body is provided with a guide member which guides the valve stem,
a depression which is depressed upward is formed in a central portion of a lower part of the valve element, and
the depression forms a space between the valve stem and the lower part of the valve element and is formed so as to be capable of housing at least a part of the guide member.

(7)

The check valve according to any one of (1) to (6), wherein
the mobile body further includes a valve stem,
the inlet pipe body part or the valve body is provided with a guide member which guides the valve stem, and
in a region that supports the guide member in the inlet pipe body part or the valve body, a protruding part which protrudes from its surroundings is formed on an outer wall surface on an inside-corner side of the flow path.

The present application claims priority on the basis of Japanese Patent Application No. 2021-39670 filed on Mar. 11, 2021 and Japanese Patent Application No. 2022-35357 filed on Mar. 8, 2022, the entire contents of which are incorporated herein by reference.

REFERENCE SIGNS LIST 1, 1X check valve
2 reciprocative body (mobile body)
3 cap
5 top plate part
5a boss
6 valve element
7 valve stem
7a screw part
7b stopper
7c engaging depression
8 packing
8a center hole
11 nut
11a washer
12 valve body
13, 14 flange part
15 mount
15a pressure reducing port
16 gasket
17 lower guide member (guide member)
17a central part
17b outer part
17c coupling part
17d lower end part
17e lower edge
17f upper edge
18 guide adapter (guide member)
19 upper guide member (guide member)
19a central part
19b outer part
19c coupling part
19d housing groove
19e outer wall
19f engaging projection
20 guide adapter (guide member)
20a disk part
20b tubular part
20c through-hole
20d rib
21 spring body
22 ferrule
23 inlet pipe body part
23a flange part
23b inflow port
23c seat
23v center
23x, 23y inner wall surface
25 outlet pipe body part
25a flange part
25b outflow port
26 lower disk
26a bottom surface
26b depression
26c protrusion
26d support part
26e engaging projection
26f insertion hole
27 upper disk
27a flat plate part
27b rib
27c cylindrical part
27d seat surface
27e depression
27f through-hole
27g peripheral edge
43 inlet pipe body part
43d protruding part
43z outer wall surface
FL flow path

The invention claimed is:

1. An angle-type check valve in which an inflow direction and an outflow direction intersect with each other, the angle-type check valve having an outside wall thereof that forms an outer surface of the angle-type check valve, the check valve comprising:
an inlet pipe body part which includes an inflow port, the inlet pipe body part constituting a first part of the outside wall;
an outlet pipe body part which includes an outflow port, the outlet pipe body part constituting a second part of the outside wall;
a mobile body which is movable to a position where a flow of a fluid is stopped and a position where a flow of the fluid is allowed; and
a valve body which houses the mobile body, wherein
insides of the inlet pipe body part, the outlet pipe body part, and the valve body are communicated to form a curved flow path from the inflow port toward the outflow port, the curved flow path providing an inside-corner side and an outside-corner side,
the mobile body includes a valve element,
the inlet pipe body part or the valve body is provided with a seat,
the seat is arranged so as to be capable of supporting the valve element,
the inflow port and the seat are arranged parallel to each other, the first part at the inside-corner side of the outside wall of the angle-type check valve intersects with the second part at the inside-corner side of the outside wall of the angle-type check valve; and an inner wall surface on an outside-corner side of the flow path in the inlet pipe body part is formed so as to curve toward a side of the outlet pipe body part as a position gets closer from the inflow port to the seat.

2. The check valve according to claim 1, wherein the mobile body further includes a valve stem, and the valve stem is arranged shifted to an inside-corner side of the flow path than a center of the inflow port as viewed from a side of the inflow port.

3. The check valve according to claim 1, wherein the mobile body further includes a valve stem,
at least a part of a lower part of the valve element is formed in a partially spherical shape which protrudes toward the inflow port,
the inlet pipe body part or the valve body is provided with a guide member which guides the valve stem,
the guide member includes a central part through which the valve stem is passed, an outer part which is more outward in the radial direction than the central part and which includes the seat, and a coupling part which couples the central part and the outer part to each other, and
a lower end part of the central part is formed in a curved surface shape with a larger curvature than a region with a partially spherical shape of the valve element.

4. The check valve according to claim 3, wherein the central part and the coupling part in the guide member are formed more depressed in a direction of separation from the valve element than the outer part.

5. The check valve according to claim 1, wherein the mobile body further includes a valve stem,
the inlet pipe body part or the valve body is provided with a guide member which guides the valve stem,
a depression which is depressed upward is formed in a central portion of a lower part of the valve element, and
the depression forms a space between the valve stem and the lower part of the valve element and is formed so as to be capable of housing at least a part of the guide member.

6. An angle-type check valve in which an inflow direction and an outflow direction intersect with each other, the check valve comprising:
an inlet pipe body part which includes an inflow port;
an outlet pipe body part which includes an outflow port;
a mobile body which is movable to a position where a flow of a fluid is stopped and a position where a flow of the fluid is allowed; and
a valve body which houses the mobile body, wherein
insides of the inlet pipe body part, the outlet pipe body part, and the valve body are communicated to form a curved flow path from the inflow port toward the outflow port,
the mobile body includes a valve element,
the inlet pipe body part or the valve body is provided with a seat,
the seat is arranged so as to be capable of supporting the valve element,
the inflow port and the seat are arranged parallel to each other, and
an inner wall surface on an outside-corner side of the flow path in the inlet pipe body part is formed so as to curve toward a side of the outlet pipe body part as a position gets closer from the inflow port to the seat, wherein
an inner wall surface on an inside-corner side of the flow path in the inlet pipe body part is arranged more inward in a radial direction than the valve element as viewed from a side of the inflow port, and
the inner wall surface on the outside-corner side of the flow path in the inlet pipe body part is arranged more outward in the radial direction than the valve element as viewed from the side of the inflow port.

7. An angle-type check valve in which an inflow direction and an outflow direction intersect with each other, the check valve comprising:
an inlet pipe body part which includes an inflow port;
an outlet pipe body part which includes an outflow port;
a mobile body which is movable to a position where a flow of a fluid is stopped and a position where a flow of the fluid is allowed; and
a valve body which houses the mobile body, wherein
insides of the inlet pipe body part, the outlet pipe body part, and the valve body are communicated to form a curved flow path from the inflow port toward the outflow port,
the mobile body includes a valve element,
the inlet pipe body part or the valve body is provided with a seat,
the seat is arranged so as to be capable of supporting the valve element,
the inflow port and the seat are arranged parallel to each other, and
an inner wall surface on an outside-corner side of the flow path in the inlet pipe body part is formed so as to curve toward a side of the outlet pipe body part as a position gets closer from the inflow port to the seat, wherein
the mobile body further includes a valve stem,
the inlet pipe body part or the valve body is provided with a guide member which guides the valve stem, and
in a region that supports the guide member in the inlet pipe body part or the
valve body, a protruding part which protrudes from its surroundings is
formed on an outer wall surface on an inside-corner side of the flow path.

* * * * *